United States Patent
Leibl

(10) Patent No.: US 9,238,394 B2
(45) Date of Patent: Jan. 19, 2016

(54) SUBFRAME FOR A MOTOR VEHICLE

(71) Applicant: AUDI AG, Ingolstadt (DE)

(72) Inventor: Peter Leibl, Manching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/328,195

(22) Filed: Jul. 10, 2014

(65) Prior Publication Data
US 2015/0014955 A1    Jan. 15, 2015

(30) Foreign Application Priority Data
Jul. 11, 2013   (DE) .......................... 10 2013 011 562

(51) Int. Cl.
| | |
|---|---|
| *B60G 21/00* | (2006.01) |
| *B60G 3/20* | (2006.01) |
| *B60G 3/24* | (2006.01) |
| *B60K 17/24* | (2006.01) |
| *B60G 7/00* | (2006.01) |
| *B60G 21/055* | (2006.01) |
| *B62D 21/11* | (2006.01) |

(52) U.S. Cl.
CPC .............. *B60G 21/005* (2013.01); *B60G 3/20* (2013.01); *B60G 3/24* (2013.01); *B60G 7/00* (2013.01); *B60G 21/0555* (2013.01); *B60K 17/24* (2013.01); *B62D 21/11* (2013.01); *B60G 2200/184* (2013.01); *B60G 2200/422* (2013.01); *B60G 2202/135* (2013.01); *B60G 2204/1222* (2013.01); *B60G 2204/143* (2013.01); *B60G 2204/15* (2013.01); *B60G 2204/19* (2013.01); *B60G 2206/0114* (2013.01); *B60G 2206/604* (2013.01)

(58) Field of Classification Search
USPC ...................... 280/124.13, 124.134, 124.137, 280/124.149, 124.152
See application file for complete search history.

(56) References Cited

U.S. PATENT DOCUMENTS

| | | | | |
|---|---|---|---|---|
| 4,392,667 | A * | 7/1983 | Shakespear ............ | 280/124.109 |
| 4,529,223 | A * | 7/1985 | Maebayashi et al. ...... | 280/5.521 |
| 5,879,026 | A | 3/1999 | Dostert et al. | |
| 8,240,688 | B2 * | 8/2012 | Miyamoto ............. | 280/124.107 |
| 8,579,310 | B2 * | 11/2013 | Tanaka et al. .......... | 280/124.135 |
| 8,616,567 | B2 * | 12/2013 | Eguchi et al. .......... | 280/124.107 |
| 2006/0261570 | A1 * | 11/2006 | Eshelman et al. ..... | 280/124.134 |

FOREIGN PATENT DOCUMENTS

| | | |
|---|---|---|
| DE | 897051 | 11/1953 |
| DE | 44 08 573 | 3/1994 |

(Continued)

*Primary Examiner* — Toan To
(74) *Attorney, Agent, or Firm* — Henry M. Feiereisen LLC.

(57) ABSTRACT

A subframe for a motor vehicle for pivotally connecting wheel suspension elements and for supporting a stabilizer which extends in a transverse direction of the motor vehicle, said subframe includes lateral longitudinal members extending in a longitudinal direction of the motor vehicle and at least one cross member connecting the longitudinal members in a transverse direction of the vehicle, the at least one cross member being constructed as a hollow profile part having a hollow profile forming a stabilizer groove, the at least one cross member having a longitudinal through passage for a cardan shaft which is drivable by a rear axle differential carried by the subframe, the through passage being vertically offset relative to the stabilizer groove. The stabilizer connects the longitudinal members in the transverse direction of the motor vehicle, and extends at least in part in the stabilizer groove between the longitudinal members.

19 Claims, 3 Drawing Sheets

(56) References Cited

FOREIGN PATENT DOCUMENTS

| DE | 198 05 463 | 2/1998 |
| DE | 198 46 399 | 10/1998 |
| DE | JP 2000 313 218 | 11/2000 |
| DE | 102004054853 | 5/2006 |
| DE | 102006001709 | 7/2007 |
| DE | 102006051682 | 2/2008 |
| DE | 102007052632 | 5/2009 |
| DE | 102011112053 | 3/2012 |
| EP | 2 336 005 | 6/2011 |
| EP | 2 517 905 | 10/2012 |
| JP | H 11-278298 | 10/1999 |
| JP | 2008-168792 | 7/2008 |
| WO | WO 2011/122012 | 10/2011 |

* cited by examiner

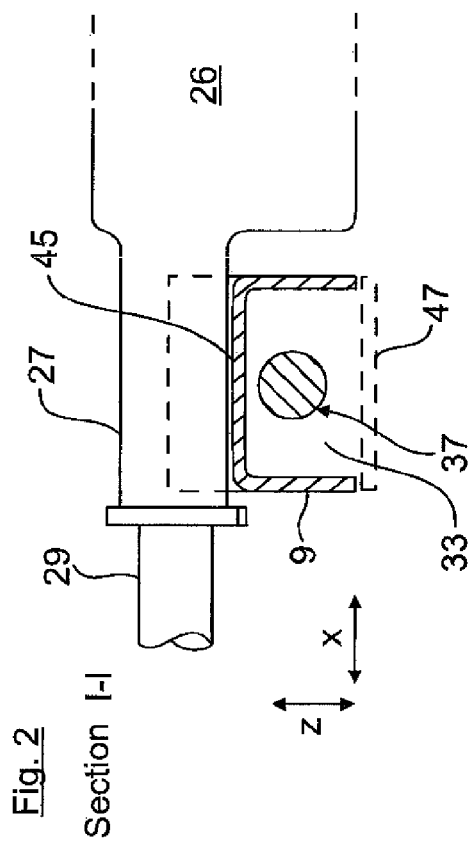
Fig. 2 Section I-I
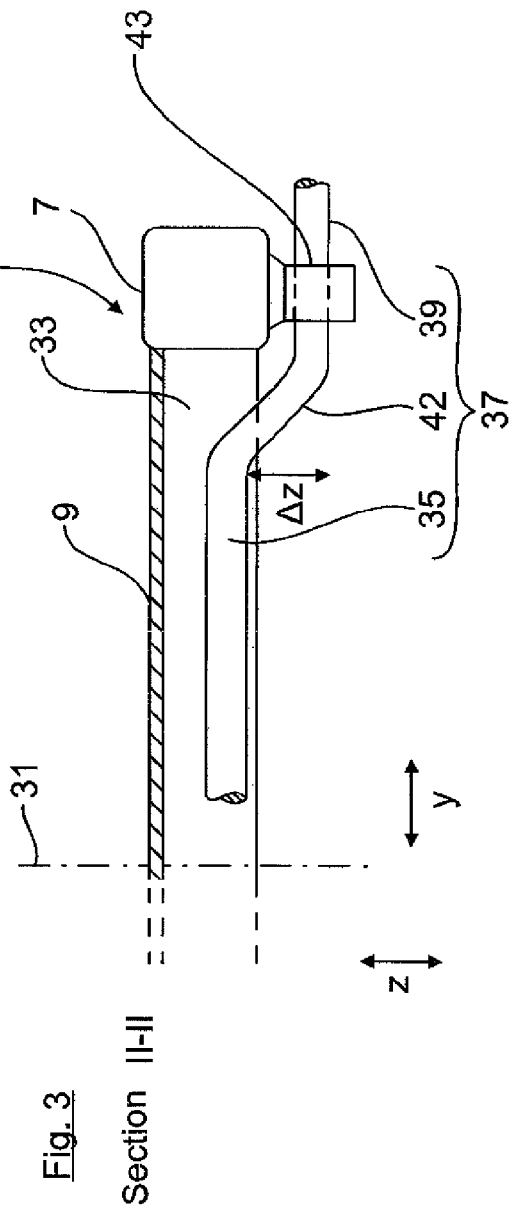
Fig. 3 Section II-II

SUBFRAME FOR A MOTOR VEHICLE

CROSS-REFERENCES TO RELATED APPLICATIONS

This application claims the priority of German Patent Application, Serial No. 10 2013 011 562.0, filed Jul. 11, 2013, pursuant to 35 U.S.C. 119(a)-(d), the disclosure of which is incorporated herein by reference.

BACKGROUND OF THE INVENTION

The present invention relates to a subframe for a motor vehicle, in particular in a rear axle of a motor vehicle.

The following discussion of related art is provided to assist the reader in understanding the advantages of the invention, and is not to be construed as an admission that this related art is prior art to this invention.

A U-shaped stabilizer bar mounted in a motor vehicle acts on the right side wheel suspension of a motor vehicle. This avoids greater lateral inclinations of the vehicle body when driving through curves. It is also known to integrate such a stabilizer bar in an active chassis control in which the stabilizer or a stabilizer part can be impinged with a torsion moment. In this way the vehicle level and/or pitch and roll movements of the vehicle can be compensated.

It would be desirable and advantageous to provide an improved subframe for a motor vehicle in which the stabilizer is arranged in a space saving manner.

SUMMARY OF THE INVENTION

The invention accounts for the fact that the space conditions in the region of a vehicle axle are very limited.

According to one aspect of the present invention, a subframe for a motor vehicle for pivotally connecting wheel suspension elements and for supporting a stabilizer which extends in a transverse direction of the motor vehicle, includes lateral longitudinal members extending in a longitudinal direction of the motor vehicle; and at least one cross member connecting the longitudinal members in a transverse direction of the vehicle, the at least one cross member being constructed as a hollow profile part having a hollow profile forming a stabilizer groove, the at least one cross member having a longitudinal through passage for a cardan shaft which is drivable by a rear axle differential carried by the subframe, the through passage being vertically offset relative to the stabilizer groove, wherein the stabilizer groove is constructed to receive the stabilizer at least over a portion of an extent of the stabilizer between the longitudinal members. The cross member thus has a stabilizer groove in which the stabilizer can be space-savingly arranged.

The stabilizer groove formed in the cross member can have an open or closed cross section. An open cross section simplifies the mounting or demounting of the stabilizer. In case of a closed cross section on the other hand the stabilizer is protected from external mechanical influences, for example stone impact during driving. The stabilizer groove in the cross member can, for example, have a U-profile shaped cross section which is continuous in the transverse direction of the vehicle. Depending on the circumstances the U-profile shaped stabilizer groove can be profiled so as to be open toward the top or the bottom or toward the front or back. For forming a stabilizer groove with a closed cross section a cover element can be provided which can for example be positioned on the free borders of the U-legs of the cross member.

The stabilizer groove formed in the cross member can extend up to the subframe-corner region viewed in transverse direction of the vehicle where it can be delimited by the respective longitudinal member. Preferably the stabilizer can extend space-savingly with its center section within the stabilizer groove. In its further extent in the transverse direction of the vehicle the stabilizer can transition outwardly into a side section, which at the subframe corner region can extend out of the stabilizer groove with an offset, for example a vertical or a horizontal offset. Preferably the side section of the stabilizer extends out of the stabilizer groove downwardly with a vertical offset. In this case it is further preferred when the side section of the stabilizer which extends out of the stabilizer groove, in its further extent outwardly passes underneath the longitudinal member in the transverse direction of the vehicle and is directly or indirectly operatively connected with the wheel carrier or control arms.

For compensating pitch or roll movements of the vehicle, torsion moments are transmitted via the stabilizer in transverse direction of the vehicle. This requires rotatably supporting the stabilizer in corresponding stabilizer bearings on the vehicle body. The stabilizer bearings required therefore can be mounted within the stabilizer groove depending on the circumstances. Alternatively the stabilizer bearings can also be arranged outside the stabilizer groove, i.e., preferably in the transverse direction of the vehicle outside the stabilizer groove on the respective lateral longitudinal members.

In a technical realization the cross member, which is configured with the stabilizer groove, can be installed as a front cross member in a rear axle subframe. The rear axle subframe can for example carry a rear axle differential, which can be driven by a cardan shaft. In the state of the art the cardan shaft usually extends below the front cross member in the longitudinal direction of the vehicle up to the rear axle differential. In contrast, according to the invention the cardan shaft can extend above the front cross member of the rear axle up to the rear axle differential or the rear axle differential is arranged with its input side above the front cross member. For this the front cross member can have on its top side a longitudinal through opening for the cardan shaft or for the input side of the rear axle differential which longitudinal through opening is open to the top.

Geometrically the stabilizer groove of the cross member is configured so that the stabilizer can elastically deform contactlessly during operation.

In an embodiment the stabilizer can be a one-piece, U-shaped stabilizer bar which extends continuously between the two vehicle sides and is directly or indirectly articulately connected to wheel guiding elements of a wheel suspension. Alternatively the invention includes a stabilizer, which is integrated in an active chassis control in which at least one electrically controllable rotary actuator can act on the stabilizer with an additional torsion moment. In this way the stabilizer can be tensioned or relaxed depending on the requirements. For example the stabilizer can be configured two-piece, i.e., with a rotary actuator per each vehicle side. Each of the rotary actuators can exert actuating forces onto a wheel suspension element of the left side or right side wheel suspension via a torsion spring rod and an output lever, which extends at an angle from the torsion spring rod.

The rotary actuators are preferably arranged at least partially, in particular entirely in the stabilizer groove.

According to another aspect of the invention a combination includes a subframe for a motor vehicle for pivotally connecting wheel suspension elements, the subframe including lateral longitudinal members extending in a longitudinal direction of the vehicle, and at least one cross member connecting the longitudinal members in a transverse direction of the motor vehicle, the at least one cross member being constructed as a hollow profile part having a hollow profile forming a stabilizer groove, the at least one cross member having a longitudinal through passage for a cardan shaft which is drivable by a rear axle differential carried by the subframe, the through passage being vertically offset relative to the stabilizer groove; and a stabilizer supported by the subframe and connecting the longitudinal members in the transverse direction of the motor vehicle, the stabilizer extending at least in part in the stabilizer groove between the longitudinal members

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows an enlarged partial sectional view taken along the sectional plane I-I of FIG. 1;

FIG. 3 shows an enlarged partial sectional view taken along the sectional plane II-II of FIG. 2.

DETAILED DESCRIPTION OF PREFERRED EMBODIMENTS

Figure 1:
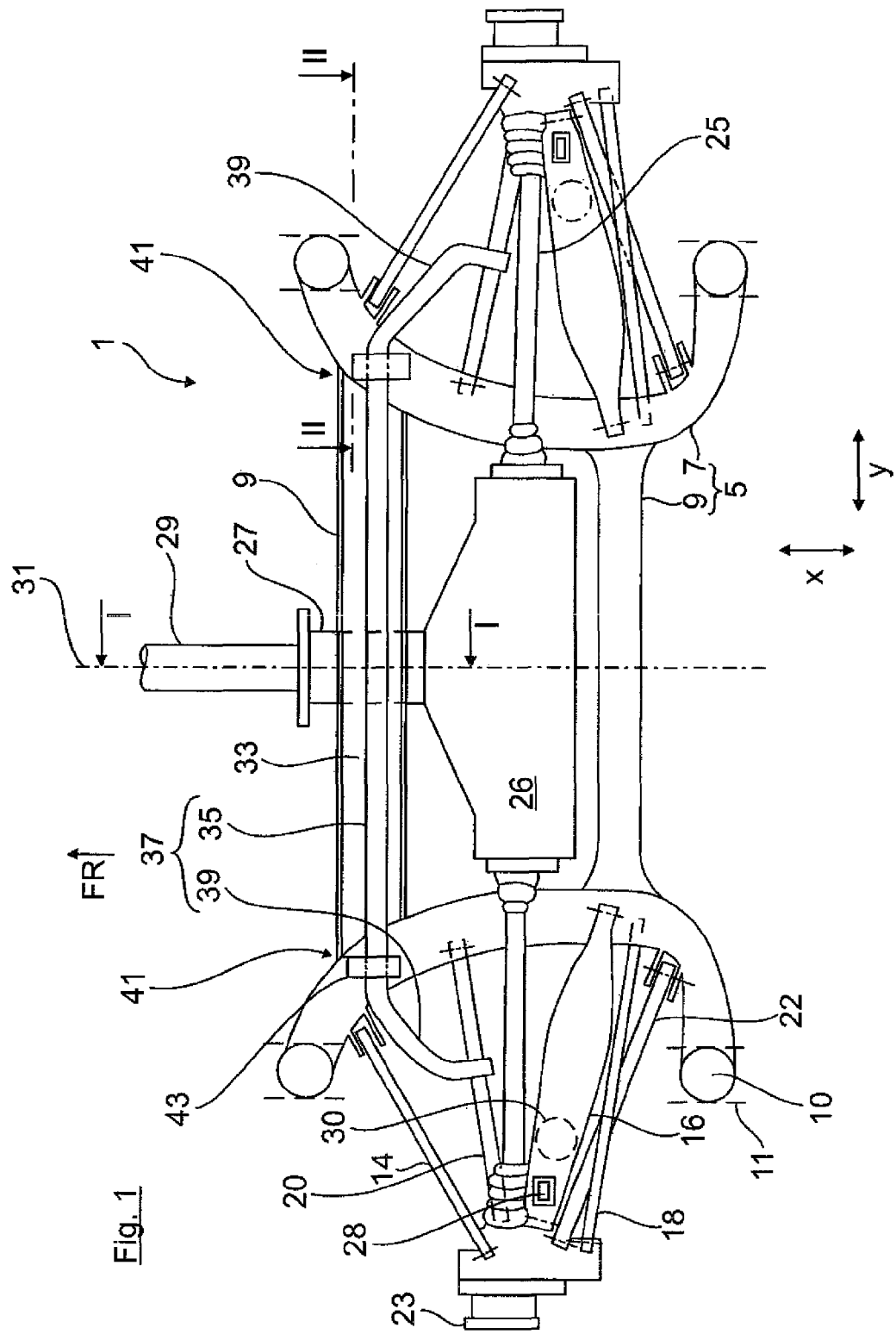
FIG. 1 shows a bottom view of a vehicle rear axle according to a first exemplary embodiment.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a bottom view of a rear axle 1 for a motor vehicle which is only shown to the extend required for understanding the invention. The rear axle 1 has a subframe 5, which is formed by longitudinal members 7 and front and rear cross members 9. In the vehicle body shell the subframe 5 is mounted via support sites 10 on vehicle body longitudinal members 11 which are only indicated by dashed lines. On both longitudinal members 7 of the subframe 5 respective lower control arms 14, 16, 18 and upper control arms 20, 22 for the wheel suspension are articulately connected on the two vehicle sides in spatially offset arrangement via not shown control arm bearings. The control arms 14-16 extend in the transverse vehicle direction y outwardly up to the respective wheel carrier 23 each of which carries a not shown right side/left side rear wheel. In the present exemplary embodiment the two rear wheels are driven by an articulated shaft 25, which is guided into a rear axle differential 26 which is attached to the subframe 5 and is only indicated schematically. The frontwardly protruding transmission input 27 of the rear axle differential 26 is drivingly connected with an indicated cardan shaft 29. The construction of the vehicle rear axle 1 described above is configured essentially mirror symmetric with regard to a vertical longitudinal center plane 31 of the vehicle, with the exception of a through passage for the exhaust gas system which is not shown in the Figures.

According to the Figures the front cross member 9 of the subframe 5 is configured as a hollow profile part. The hollow profile has a U-shaped cross section, which is open toward the bottom in the direction of the road. The hollow profile of the front cross member 9 is geometrically configured so that it can be used as stabilizer groove 33, in which a center section 35 of a stabilizer 37 extends. In the present exemplary embodiment the stabilizer 37 is configured one-piece and U-shaped, namely with the already mentioned center section 35 which transitions outwardly in the vehicle transverse direction y with material unity into output levers 39 which protrude in the longitudinal direction x of the vehicle towards the rear. In FIG. 1 the output levers 39 of the stabilizer bar 37 are supported on the control arm 20.

As can be seen from FIG. 2, the stabilizer groove 33 has a U-profile shaped cross section, which is continuous in the vehicle transverse direction y. The center section 35 of the stabilizer 37 extends as far as into the subframe corner region 41 at which the cross member 9 and the lateral longitudinal member 7 meet. As shown in FIG. 3 the stabilizer groove 33 is delimited in the vehicle transverse direction y by the longitudinal member 7. In the subframe corner region 41, the center section 35 of the stabilizer bar 37 is guided downwardly out of the stabilizer groove 33 with an S-shape 42 via a vertical offset Az. The S-shape 42 transitions into the longitudinal arm 39 which is supported on the control arm 20.

The side sections 42 of the stabilizer 37 are each rotatably supported in a respective stabilizer bearing 43. The stabilizer bearing 43 is in the present exemplary embodiment not arranged within but rather outside the stabilizer groove 33. Due to their arrangement outside the stabilizer groove 33 the free cross section of the stabilizer groove 33 can be kept correspondingly small.

As can be seen from FIG. 2, the transmission input 27 of the rear axle differential 26 and the cardan shaft which is drivingly connected therewith are positioned above the front cross member 9. For this an approximately U-shaped longitudinal through passage 45 which is open toward the top is formed in the tip side of the front cross member 9. According to FIG. 2 the cross section of the downwardly open stabilizer groove 33 is delimited with a cover 47 which is shown in dashed lines. In this way the stabilizer 37 is protected from external influences for example stone impact. This obviates an otherwise required cost intensive surface treatment of the stabilizer 37. In FIG. 2 the stabilizer 37 is arranged at a vertical offset below the transmission input 27 of the rear axle differential, namely so as to enable a contactless elastic deformation of the stabilizer 37 in the stabilizer groove 33 during operation of the vehicle.

Figure 4:
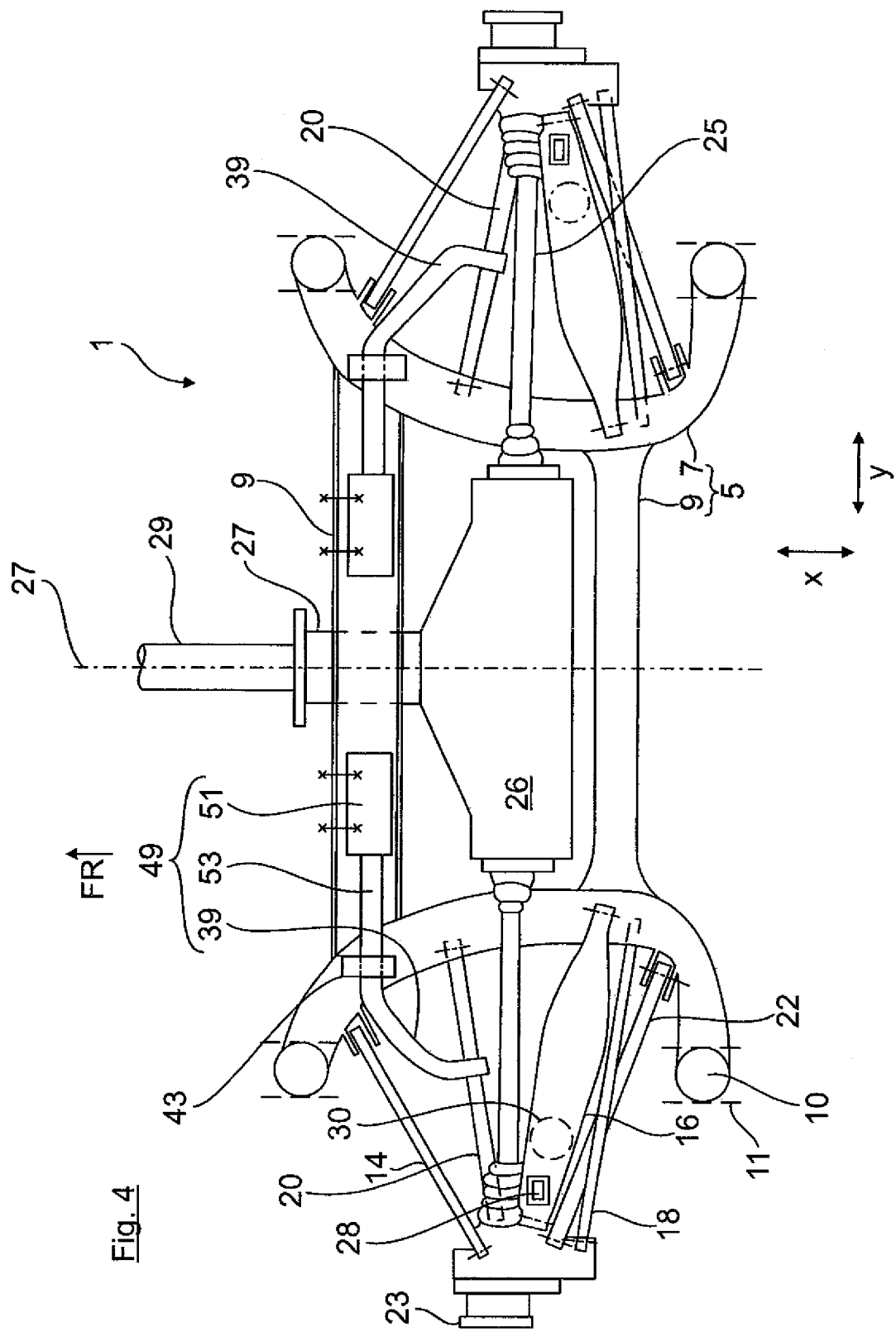
FIG. 4 shows a second exemplary embodiment in a view corresponding to FIG. 1.

FIG. 4 shows a vehicle rear axle according to a second exemplary embodiment. The principle construction of the vehicle rear axle is essentially the same as in the first exemplary embodiment. In contrast to the first exemplary embodiment a two-piece stabilizer 37 with stabilizer parts 49 which are independent of each other is provided instead of the one-piece stabilizer 37. Each of the two stabilizer parts 49 has a rotary actuator 51 which can be eclectically controlled by the chassis control and which transitions outwardly in the vehicle transverse direction y via a torsion spring rod 53 into the rearwardly protruding output levers 39. The respective torsion spring rod 51 is rotatably supported in the stabilizer bearings 43. The two stabilizer parts 49 are arranged mirror symmetric relative to the longitudinal center plane 31 of the vehicle. The rotary actuators 51 are mounted within the stabilizer groove 33 on the front cross member.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A subframe for a motor vehicle for pivotally connecting wheel suspension elements and for supporting a stabilizer which extends in a transverse direction of the motor vehicle, said subframe comprising:
    lateral longitudinal members extending in a longitudinal direction of the motor vehicle; and
    at least one cross member connecting the longitudinal members in a transverse direction of the vehicle, said at least one cross member being constructed as a hollow profile part having a hollow profile forming a stabilizer groove, said at least one cross member having a longitudinal through passage for a cardan shaft which is drivable by a rear axle differential carried by the subframe, said through passage being vertically offset relative to the stabilizer groove, wherein said stabilizer groove is constructed to receive the stabilizer at least over a portion of an extent of the stabilizer between the longitudinal members.

2. The subframe of claim 1, wherein the stabilizer groove is constructed to receive the stabilizer over an entire extent of the stabilizer between the longitudinal members.

3. The subframe of claim 1, further comprising a cover element, wherein the stabilizer groove has an open or closed cross section, and wherein the open cross section of the stabilizer groove is closable by the cover element.

4. The subframe of claim 3, wherein the open cross section is a U-profile shaped cross section which is continuous in the transverse direction of the vehicle.

5. The subframe of claim 1, wherein the stabilizer groove is open toward a top or a bottom in a vertical direction of the vehicle, or toward a front or a rear in the longitudinal direction of the vehicle.

6. The subframe of claim 1, wherein the longitudinal members delimit the stabilizer groove in the transverse direction of the vehicle in a respective corner region of the subframe.

7. The subframe of claim 1, further comprising stabilizer bearings arranged outside the stabilizer groove in the vehicle transverse direction, for rotatably supporting the stabilizer.

8. The subframe of claim 1, wherein the subframe is a rear axle subframe and wherein the at least one cross member which is formed with the stabilizer groove is mounted as a front cross member in the rear axle subframe.

9. The subframe of claim 1, wherein the longitudinal through passage for the cardan shaft is an indentation, which is formed in a top side of the at least one cross member.

10. An arrangement for a motor vehicle, comprising:
    a subframe for a motor vehicle for pivotally connecting wheel suspension elements, said subframe comprising lateral longitudinal members extending in a longitudinal direction of the vehicle and at least one cross member connecting the longitudinal members in a transverse direction of the motor vehicle, said at least one cross member being constructed as a hollow profile part having a hollow profile forming a stabilizer groove, said at least one cross member having a longitudinal through passage for a cardan shaft which is drivable by a rear axle differential carried by the subframe, said through passage being vertically offset relative to the stabilizer groove; and
    a stabilizer supported by the subframe and connecting the longitudinal members in the transverse direction of the motor vehicle, said stabilizer extending at least in part in the stabilizer groove between the longitudinal members.

11. The arrangement of claim 10, wherein the stabilizer extends continuously in the stabilizer groove between the longitudinal members.

12. The arrangement of claim 10, wherein the longitudinal members delimit the stabilizer groove in the transverse direction of the vehicle in a respective corner region of the subframe.

13. The arrangement of claim 12, wherein the stabilizer has at least one side section which extends downwards with a vertical offset out of the stabilizer groove in the corner region of the subframe.

14. The arrangement of claim 13, wherein the side section of the stabilizer passes underneath the longitudinal member in the transverse direction of the vehicle.

15. The arrangement of claim 10, wherein the stabilizer extends contactless within the stabilizer groove of the at least one cross member.

16. The arrangement of claim 10, further comprising an active chassis control, said active chassis control comprising the stabilizer and at least one rotary actuator operatively connected with the stabilizer for acting on the stabilizer with a torsion moment.

17. The arrangement of claim 16, wherein the rotary actuator is constructed as electrically controllable rotary actuator.

18. The arrangement of claim 10, wherein the rotary actuator is arranged at least partially in the stabilizer groove.

19. The arrangement of claim 18, wherein the rotary actuator is arranged entirely in the stabilizer groove.

* * * * *